United States Patent
Volk et al.

(10) Patent No.: US 7,146,757 B2
(45) Date of Patent: Dec. 12, 2006

(54) COMBINED ANIMAL INFORMATION TAG AND SYSTEM

(75) Inventors: Daniel J. Volk, Alpharetta, GA (US); Jeffrey Mark Kearnan, Visalia, CA (US); Steven J. Volk, Turlock, CA (US)

(73) Assignee: Volk Enterprises, Inc., Turlock, CA (US)

( * ) Notice: Subject to any disclaimer, the term of this patent is extended or adjusted under 35 U.S.C. 154(b) by 175 days.

(21) Appl. No.: 10/824,965

(22) Filed: Apr. 15, 2004

(65) Prior Publication Data

US 2004/0194358 A1    Oct. 7, 2004

Related U.S. Application Data

(63) Continuation of application No. 10/159,756, filed on May 29, 2002, now Pat. No. 6,907,684.

(51) Int. Cl.
*G09F 3/00* (2006.01)
*A01K 11/00* (2006.01)

(52) U.S. Cl. .............................. 40/300; 40/301; 40/302; 40/304

(58) Field of Classification Search ............ 40/300–304
See application file for complete search history.

(56) References Cited

U.S. PATENT DOCUMENTS

| | | | |
|---|---|---|---|
| 2,564,629 A | 8/1951 | Skandel | |
| 2,972,828 A | 2/1961 | Dumbrell | |
| 3,388,492 A | 6/1968 | Nichols | |
| 3,826,030 A | 7/1974 | Read | |
| 3,942,480 A | 3/1976 | Hair | |
| 4,059,074 A | * 11/1977 | Furer et al. | 119/655 |
| 4,353,225 A | 10/1982 | Rogers | |
| 4,428,327 A | 1/1984 | Steckel | |
| 4,581,834 A | 4/1986 | Zatkos | |
| 4,953,313 A | 9/1990 | Scott | |
| 5,473,830 A | 12/1995 | Doble | |
| 5,643,284 A | 7/1997 | Hicks | |
| 6,055,752 A | 5/2000 | Ritchey | |
| 6,095,915 A | 8/2000 | Geissler | |
| 6,145,225 A | 11/2000 | Ritchey | |

OTHER PUBLICATIONS

US 6,330,759, 12/2001, Wikan (withdrawn)

* cited by examiner

*Primary Examiner*—Cassandra Davis
(74) *Attorney, Agent, or Firm*—Powell Goldstein LLP; Laurence P. Colton

(57) ABSTRACT

A combined animal information tag and system comprising a relatively permanent primary information tag attached directly to the animal to provide primary information about the animal and a removable or replaceable supplemental identification or informational tag attached to the primary information tag to provide additional information about the animal.

20 Claims, 5 Drawing Sheets

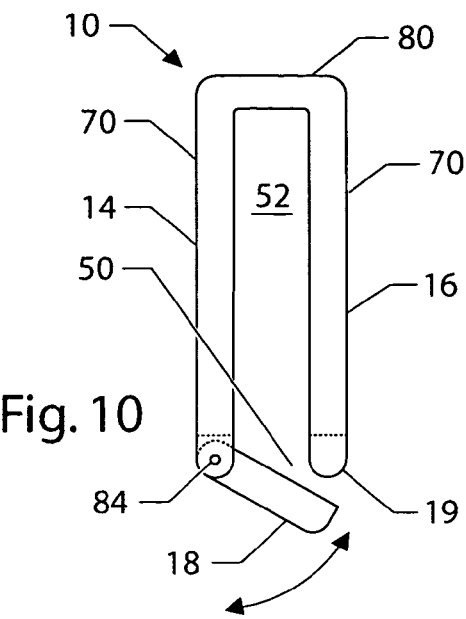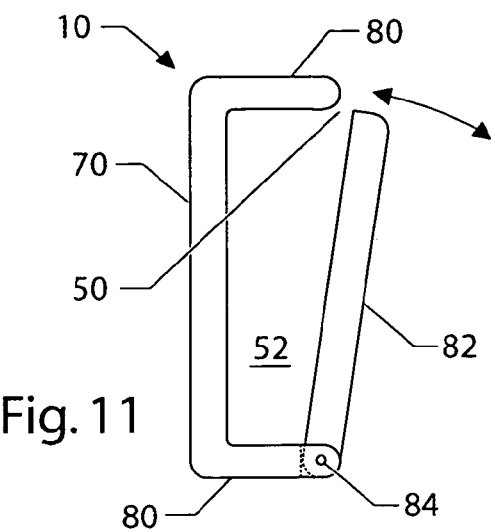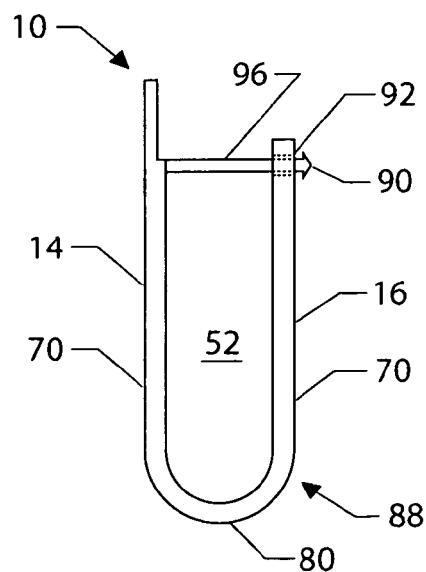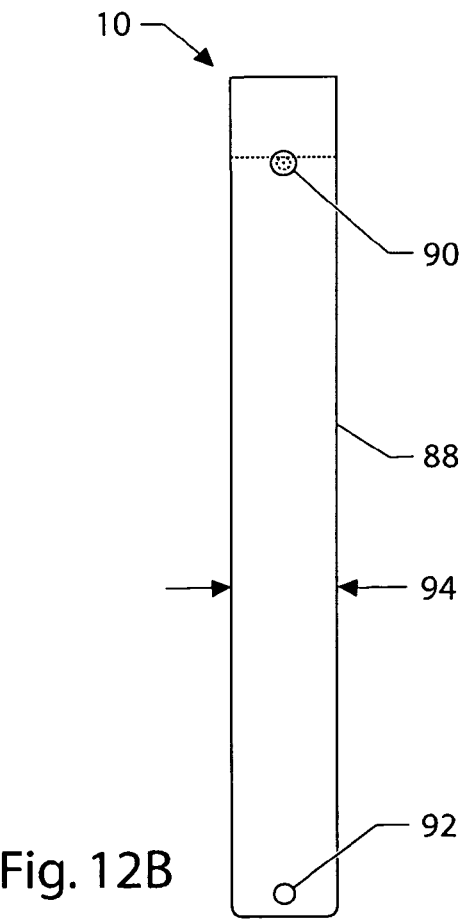

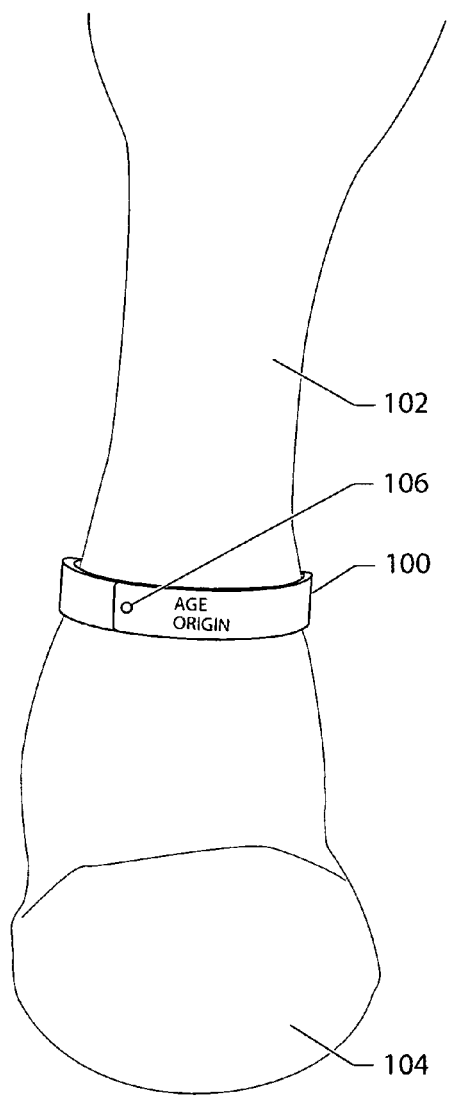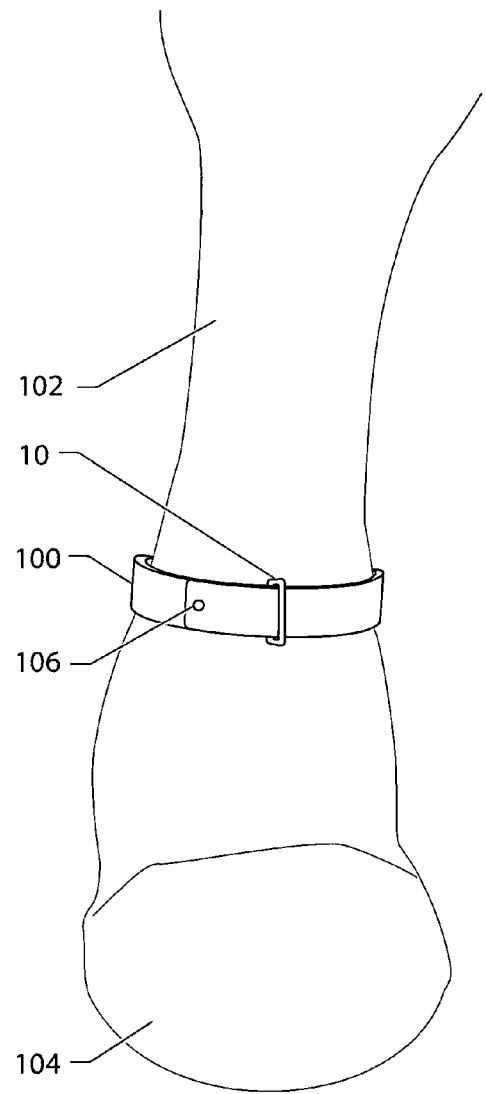
Fig. 13
(PRIOR ART)
Fig. 14

US 7,146,757 B2

COMBINED ANIMAL INFORMATION TAG AND SYSTEM

STATEMENT OF RELATED APPLICATIONS

This patent application is a continuation of U.S. patent application Ser. No. 10/159,756 having a filing date of 29 May 2002 now U.S. Pat. No. 6,907,684.

BACKGROUND OF THE INVENTION

1. Technical Field

The present invention relates generally to a device for supplementing the information on an animal identification tag and more particularly to a combination device for providing information about an animal comprising a relatively permanent animal information tag, such as an ear tag or ankle tag, and a supplemental information member that is attached reversibly or removably to the relatively permanent animal information tag.

2. Prior Art

The use of tags for the purposes of tracking animals (typically livestock such as cows, sheep, and pigs) is a prevalent practice in the United States and abroad. The tagging practice helps livestock holders identify both the ownership of the livestock and whether the livestock has been treated with antibiotics and growth hormones. As such, tags play a vital role in the meat producing industry.

Not surprisingly, the prior art discloses an array of such tags, the most common of which appear to be ear tags. U.S. Pat. No. 3,826,030 to Read discloses an ear tag that can have two tabs each having multiple indicia. U.S. Pat. No. 3,388,492 to Nichols discloses an ear tag having a flat surface for a first indicia and a second indicia that can be snapped into a hole in the flat surface. U.S. Pat. No. 4,581,834 to Zatkos discloses a locking ear tag with a relatively simple structure. U.S. Pat. No. 5,473,830 to Doble discloses an ear tag comprising numbers, pins, notches, slots and other devices to show information. U.S. Pat. No. 6,055,752 to Ritchey discloses an ear tag with a hollow interior for storing articles. Thus, the idea of an ear tag with one or more indicia is known in the art.

Tags are generally placed onto the respective animal early in the animal's life. In many cases, as the tags connote ownership, the tags are placed on the animals as soon as the animal is under the control of the owner. And as some information is not available at the time the tag is placed on the animal, the information on the tag may not reflect the actual status of the animal. Additionally, as hormones or antibiotics are given subsequently and over time, this information may not be reflected on the tag. As a result, the tags may not always provide the most current and acurate information regarding the animal.

Further complicating the matter is that many prior art tags are generally (and purposely) difficult to remove. In fact, in many situations, the ear tags are removed with the use of pliers and the like. Thus, time and patience are required to remove an animal tag, which is not always convenient, especially if the tag needs to be updated or modified with more current information. Further, information about specific animals often is maintained on a computer database. However, a common worker typically is not able to revert to a computer to determine information about the animal on a timely basis. Thus, having as much information as possible in a readily discernable format on or attached to the animal would speed up the process of ascertaining the information about the specific animal.

Accordingly, there is a need for a device that can be used to modify the tags, or the information on tags, that are already in place on an animal. There is also a need for the ability to provide as much information about an animal as possible, but in a readily discernable manner. There is also a need for a supplemental device to be able to be placed easily on the permanent tag. There is also a need for such a device that can be removed, modified or changed easily to reflect the modified or changed information or status. There is also a need for a combination device comprising a relatively permanent animal information tag, such as those known in the art, and a removable or replaceable supplemental information member that can be attached to the relatively permanent animal information tag, so as to create a readily modifiable animal information system. It is to these and other needs that the present invention is directed.

BRIEF SUMMARY OF THE INVENTION

Briefly, the present invention is a combination of a supplemental tag that fits on or around many common prior art relatively permanent animal information tags already in place (that is, attached to) the animal. Preferably, the supplemental tag is visible from a distance and is not hidden behind body of the animal. For the purposes of this specification, the term "permanent tag" is used to described a primary animal information tag component that is relatively permanently attached to the animal, such as the known ear tags and ankle tags. Such permanent tags are meant to remain on the animal throughout its life, or for at least a defined time period, without significant change, but may be removable, generally with difficulty and/or with the destruction of at least a portion of the permanent tag. For the purposes of this specification, the term "supplemental tag" is used to describe a supplemental animal information tag component that is removable and replaceable on the permanent tag.

In one example, for animal ear tags, the supplemental tag can be placed on the permanent tag between the main permanent tag body and the animal, generally proximal to the animal's ear. One advantage of placing the supplemental tag between the permanent tag body and the animal is that such a placement does not obstruct the view of information contained on the permanent tag body. Another advantage of this placement is that the neck of the permanent tag, which is the portion of the permanent tag between the main permanent tag body and the attachment point of the permanent tag to the animal, often is narrower that the main permanent tag body. As a result, the supplemental tag is more secure on the neck and can be a smaller structure than if the supplemental tag were placed on the main permanent tag body.

In another example, for animal ankle tags, which are akin to a bracelet about the animal's ankle, the supplemental tag can be placed over or about the permanent tag. One advantage of placing the supplemental tag over or about the permanent tag is that is can be moved or grasped easily by a worker to review the information on the supplemental tag or on the permanent tag. Another advantage of this placement is that the supplemental tag is out of the way and will not interfere with the animal's movement. As a result, the supplemental tag can provide the supplemental information without inconveniencing either the animal or the worker.

Other examples of how the supplemental tag can be applied to and combined with a known or future type of permanent tag, and the various different types of known or future permanent tags to which the supplemental tag can be attached and combined with, are within the scope of this invention and will become apparent to those of ordinary skill I the art upon reading this specification.

More specifically, the supplemental tag comprises an identification member that can be a single element with a generally C-shaped or looped configuration, which partially resembles a "0" shape with an entrance slot. The structure comprises two arms that generally define an attachment cavity for attaching for attaching the supplemental tag to the permanent tag. The ends of the two arms can be located proximally to each other and can form an entrance slot. Alternatively, the two ends of the arms can be joinable in that the arms are joined together after the supplemental tag is placed around the tag neck. Alternatively, the arms can be of different lengths. The entrance slot can be located at many different positions on the supplemental tag.

The permanent tag neck, for ear tags and the like, or the permanent tag body, for ankle tags and the like, enters the attachment cavity through the entrance slot. As the supplemental tag is pushed or snapped onto the permanent tag neck or permanent tab body, in one embodiment one or more of the arms can be deflected, which temporary enlarges the entrance slot to allow the permanent tag neck or permanent tag body to pass therethrough. For example, the arms could deflect outwards, forwards, and/or backwards relative to their initial position by utilizing the elasticity of the material of construction to allow the permanent tag neck or permanent tag body in the attachment cavity. In an alternate embodiment, the inner edge of one or both arms can be provided with a tab at the end of the arm to lock the arm against the permanent tag neck or permanent tag body. In another alternate embodiment, the ends of the arms can be provided with closure means that cooperate with each other to enclose or encircle the permanent tag neck or permanent tag body.

Once the permanent tag neck or permanent tag body is substantially within the attachment cavity, the arms can begin to return to their original positions or be clipped or locked. As the attachment cavity preferably has a size at least the size of the permanent tag neck or permanent tag body, the return of the arms to their initial positions secures the supplemental tag around the permanent tag neck or permanent tag body. As a result, the supplemental tag is securely but removably attached on the permanent tag.

In operation and use, the supplemental tag is adapted for mounting about the permanent tag neck or permanent tag body of an animal tag for tagging an animal with information. As described herein, the attachment cavity of the supplemental tag is sized so that the permanent tag neck or permanent tag body can be fitted therethrough. As the permanent tag can be already on the animal, the supplemental tag can be used to place additional information on the permanent tag. Further, a user can add multiple supplemental tags to continually add information to the permanent tag. Additionally, a user can remove a supplemental tag that is indicative of various outdated or incorrect information. Thus, the supplemental tag provides a user with a device that can used to flexibly add or remove information about the animal.

One advantage of the supplemental tag is that it can be used to help maintain the accuracy of the information on an animal tag. As the supplemental tag can fit very easily around a permanent tag, a user can simply place the supplemental tag onto a permanent tag to update the information. More specifically, for example, if an animal is given antibiotics after the permanent tag is placed on an animal, the user can simply place the correct supplemental tag on the permanent tag to indicate that an antibiotic was indeed given. Alternatively, a supplemental tag can be used to correct a defect in the information on a permanent tag already attached to an animal.

An array of means can be used to allow the supplemental tag to identify specific information regarding the animal. For example, the supplemental tag can be a specific color or shape, wherein the specific color or shape signifies or indicates specific information about a tagged animal. Alternatively, the supplemental tag can have language affixed thereon conveying the information desired to be attached. Alternatively, the supplemental tag can have a bar code or computer "smart" chip. It is understood that the supplemental tag can convey information in other ways than described herein.

These features, and other features and advantages of the present invention, will become more apparent to those of ordinary skill in the relevant art when the following detailed description of the preferred embodiments is read in conjunction with the appended drawings in which like reference numerals represent like components throughout the several views.

BRIEF DESCRIPTION OF THE DRAWINGS

FIG. 10 is a top view of a seventh embodiment of a supplemental tag.

FIG. 11 is a top view of an eighth embodiment of a supplemental tag.

FIG. 12A is a top view of a ninth embodiment of a supplemental tag shown in a closed position.

FIG. 12B is a plan view of the ninth embodiment of a supplemental tag shown in FIG. 12A shown in a open position.

FIG. 13 is a front side view of a prior art exemplary permanent ankle tag.

FIG. 14 is a front side view of a representative embodiment of a supplemental tag as mounted on the tag body of the permanent tag shown in FIG. 13.

PREFERRED EMBODIMENTS OF THE PRESENT INVENTION

Figure 1:
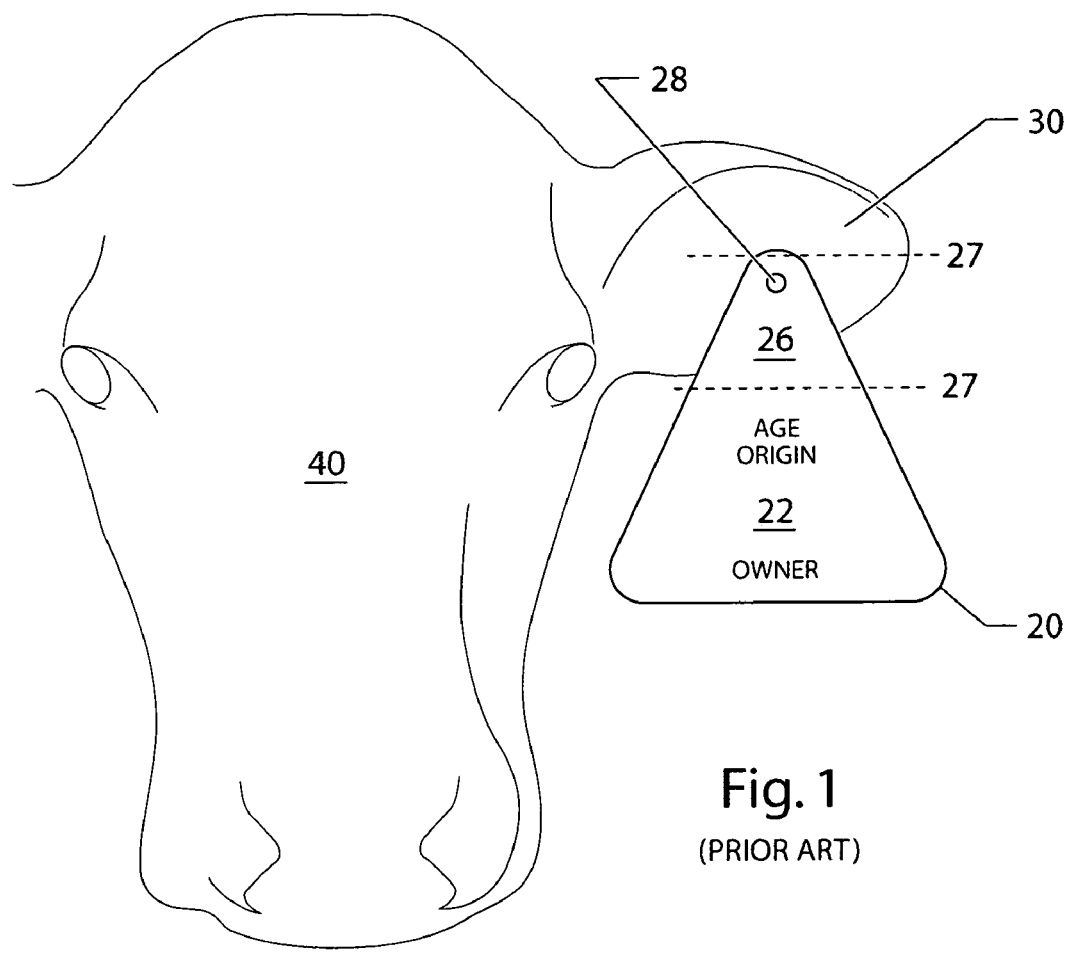
FIG. 1 is a front side view of a prior art exemplary permanent ear tag.

The general structure of a first common prior art permanent tag, namely animal ear tag 20, is shown in FIG. 1 and a second common prior art permanent tag, namely animal ankle tag 100, is shown in FIG. 13. As shown in FIG. 1, permanent tag 20 as mounted on an exemplary ear 30 of animal 40, comprises permanent tag body 22, permanent tag neck 26 (located between dashed lines 27), and permanent tag attachment means 28. As shown in FIG. 13, permanent tag 100 as mounted on an exemplary ankle of an animal leg between shin 102 and hoof 104, comprises a generally planar piece of material wrapped about the animal leg and secured with conventional securing means 106. As shown, permanent tag body 22 contains biographical and historical information (such as the origin, age and owner) connected with animal 40. Often, permanent tag 20, 100 is colored and has a large identification number imprinted thereon. Permanent tag body 22 of ear tag 20 often is generally substantially larger in size (width and/or length) than permanent tag neck 26 of ear tag 20. Ear tag 20 is generally placed on animal 40 via permanent tag attachment means 28. Embodiments of the present invention can be used to supplement the information reflected on permanent tag 20, 100, as well as other common permanent tags having the same or a similar general size and shape.

For ease of reading, the following detailed description of the preferred embodiments will be phrased in connection with an ear tag 20 embodiment. However, it must be appreciated that the description is apt for an ankle tag 100 embodiment or other permanent tag embodiments, and the description is not meant to be limited to ear tag 20 embodiments.

Figure 2:
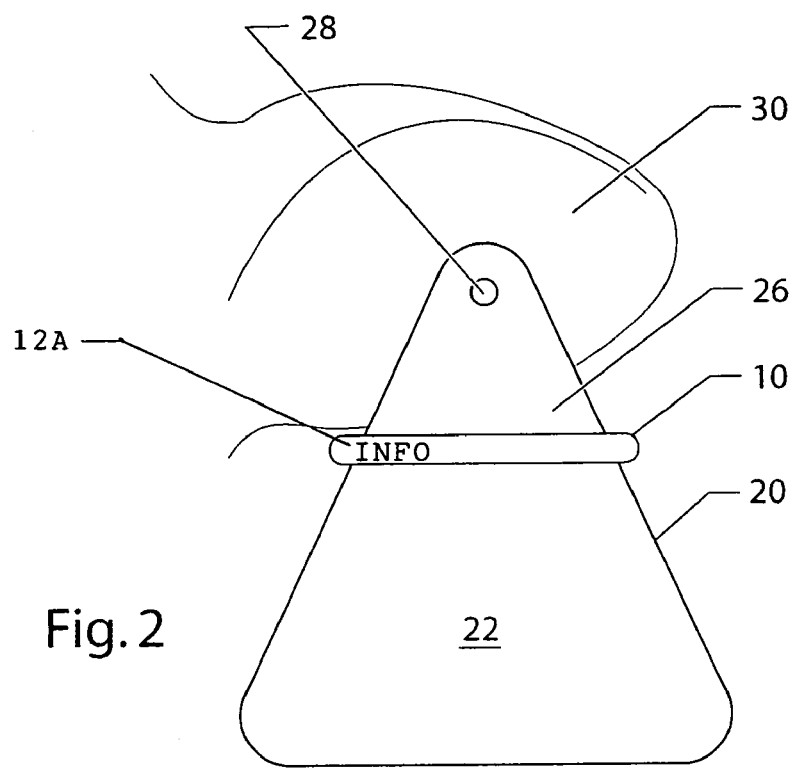
FIG. 2 is a front side view of a representative embodiment of a supplemental tag as mounted on the tag neck of the permanent tag shown in FIG. 1.
Figure 3:
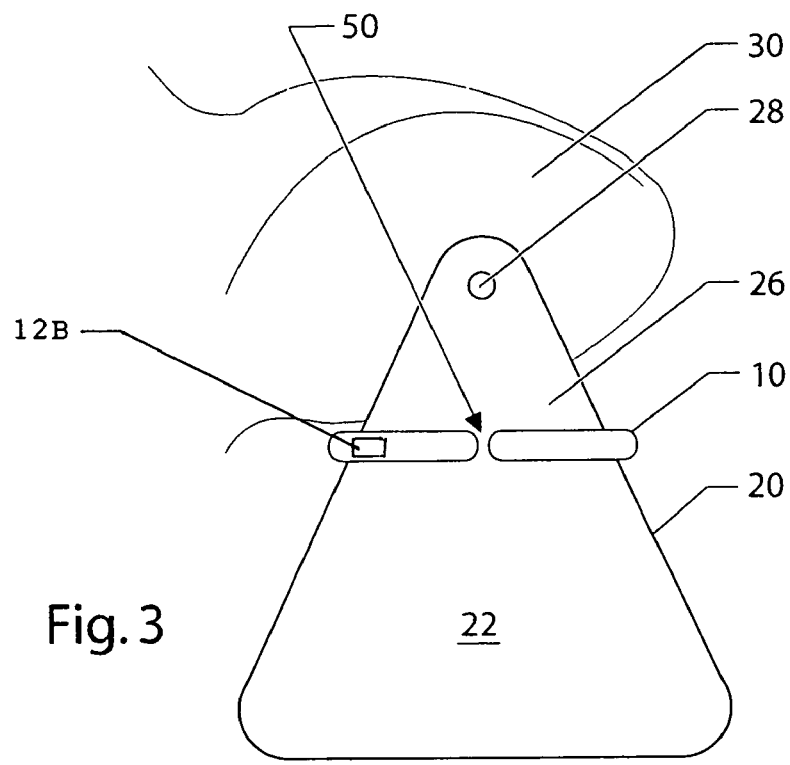
FIG. 3 is a rear side view of a representative embodiment of a supplemental tag as mounted the permanent tag neck of the permanent tag shown in FIG. 1.

Referring now to FIGS. 2 and 3, supplemental tag 10 fits around permanent tag neck 26 of an ordinary prior art ear tag 20. More particularly, supplemental tag 10 can be placed on permanent tag neck 26 between permanent tag body 22 and ear 30. One advantage of placing supplemental tag 10 between permanent tag body 22 and ear 30 is that such a placement does not obstruct the view of information contained on permanent tag body 22. Also, supplemental tag 10 is sized so that it cannot slip over permanent tag body 22 or onto ear 30. Preferably, supplemental tag 10 is visible from a distance and is not hidden behind ear 30 of animal 40.

FIG. 2 specifically shows a front view of supplemental tag 10 on permanent tag 20 and FIG. 3 specifically shows a rear view of supplemental tag 10 on permanent tag 20. In the view shown in FIG. 2, it can be seen that supplemental tag 10 preferably presents a uniform surface to the outside relative to animal 40. This is for at least two reasons. First, a uniform surface is less likely to get caught on branches or fences as the animals goes about its daily activities. Second, a uniform surface can contain more information than a broken surface. In the view shown in FIG. 3, it can be seen that entrance slot 50 or the equivalent is located on the inside relative to animal 40. This also is for at least the two reasons mentioned previously.

Figure 4:
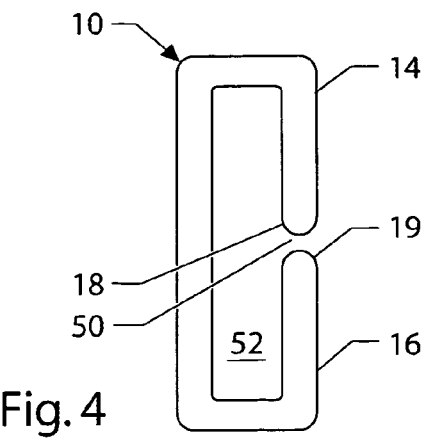
FIG. 4 is a top view of a first embodiment of a supplemental tag.

Referring now to FIG. 4, a first embodiment of supplemental tag 10 is shown. This first embodiment comprises an identification member that can be a single element with a generally C-shaped or looped configuration, which partially resembles a "0" shape with an egress slot. The structure comprises two arms 14, 16 that generally define an attachment cavity 52 for attaching supplemental tag 10 to permanent tag 20. Preferably, supplemental tag 10 has a rounded structure, or at least rounded edges, that can help prevent supplemental tag 10 from catching on the stanchion or on other objects with which animal 40 comes into contact. Alternatively, supplemental tag 10 can have a circular, oval, square, triangular or other geometric or non-geometric cross-section based on the user's desires. Different cross-sections also can indicate, for example, different information.

Arms 14, 16 can be located proximally to each other. In one preferred embodiment, the ends 18, 19 of arms 14, 16 approximately abut each other and form entrance slot 50 through which permanent tag neck 26 passes into attachment cavity 52. Alternatively, arms 14, 16 can be joinable in that arms 14, 16 are joined after supplemental tag 10 is placed around permanent tag neck 26. The distance between the ends 18, 19 of arms 14, 16 define entrance slot 50 and therefore can affect the ease of which supplemental tag 10 can be removed from (or placed on) permanent tag neck 26. Once permanent tag neck 26 is substantially within attachment cavity 52, arms 14, 16 can begin to return to their original positions. As attachment cavity 52 preferably is at least the size of permanent tag neck 26, the return of arms 14, 16 to their initial positions secures supplemental tag 10 around permanent tag neck 26.

Figure 5:
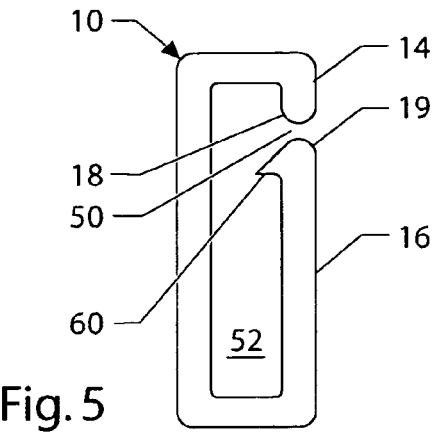
FIG. 5 is a top view of a second embodiment of a supplemental tag.

Referring now to FIG. 5, a second embodiment of supplemental tag 10 is shown. In this second embodiment, at one or both of ends 18, 19 of arms 14, 16 of supplemental tag 10, there can be tooth structure 60 that can function to help further secure supplemental tag 10 onto permanent tag neck 26. As shown in FIG. 5, tooth structure 60 on end 19 of arm 16 of supplemental tag 10 can aid in securing supplemental tag 10 to permanent tag 20. More specifically, because tooth structure 60 extends inwardly from arm 16, the placement of supplemental tag 10 onto permanent tag 20 can cause tag neck 26 to fit within the area of attachment cavity 52 below tooth structure 60 and to abut tooth structure 60. This will help prevent permanent tag 20 from sliding out of attachment cavity 52. Alternatively, if permanent tag neck 26 occupies the entire length of attachment cavity 52, an elastic force may be applied to permanent tag 20, that is, tooth structure 14 can place pressure on permanent tag 20. The pressure from tooth structure 60 can further secure supplemental tag 10 on permanent tag 20.

Preferably, permanent tag neck 26 enters attachment cavity 52 through entrance slot 50. As supplemental tag 10 is pushed or snapped onto permanent tag neck 26, one or both of arms 14, 16 are deflected, which temporary enlarges entrance slot 50 to allow permanent tag neck 26 pass therethrough. For example, arms 14,16 could deflect outwards, forwards, and/or backwards (relative to their initial position) by utilizing the elasticity of the material of construction to allow permanent tag neck 32 in attachment cavity 52. Once permanent tag neck 26 is substantially within attachment cavity 52, arms 14, 16 can begin to return to their original positions. As attachment cavity 52 preferably is at least the size of permanent tag neck 26, the return of arms 14,16 to their initial positions secures supplemental tag 10 around permanent tag neck 26.

It is understood that persons with ordinary skill in the art can determine the appropriate dimensions of entrance slot 50 and attachment cavity 52 based on the permanent tag 20 onto which supplemental tag 10 is to be placed, and thus the appropriate overall dimensions of supplemental tag 10, based on factors including the dimension of permanent tag neck 26 of the permanent tag 20 that supplemental tag 10 is engaging. As the selected dimensions can affect the degree of freedom of supplemental tag 10 around permanent tag neck 26, one of ordinary skill in the art can select dimensions to best fit with the model of permanent tag 20. For example, persons with ordinary skill in the art can determine the preferred dimensions based a particular model of a permanent tag 20 on which the present invention will be used, or for a one-size-fits-all version.

Additional illustrative embodiments of a supplemental tag 10 are shown in FIGS. 6 through 11. As shown in FIGS.

Figure 6:
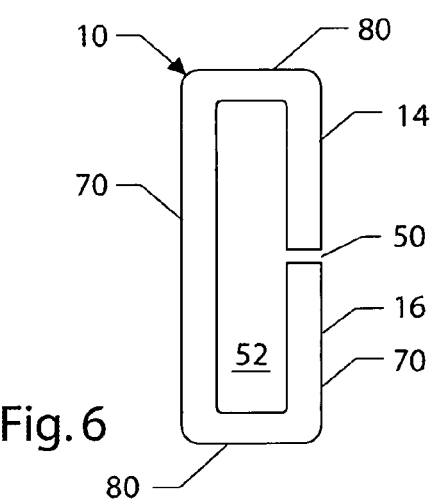
FIG. 6 is a top view of a third embodiment of a supplemental tag.
Figure 7:
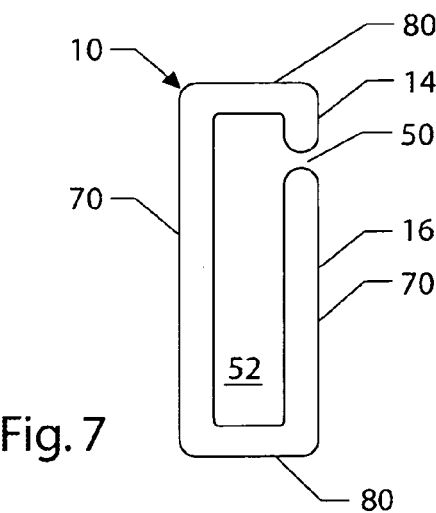
FIG. 7 is a top view of a fourth embodiment of a supplemental tag.
Figure 8:
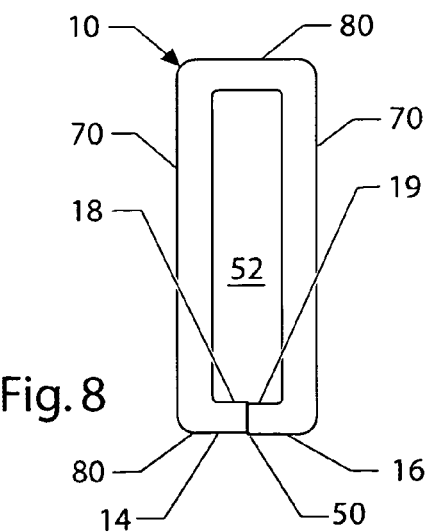
FIG. 8 is a top view of a fifth embodiment of a supplemental tag.

6-11, entrance slot 50 can be made so that it resides in an array of positions. FIG. 6 shows entrance slot 50 in the center of the elongated section 70 of supplemental tag 10. Alternatively, FIG. 7 shows entrance slot 50 at the offset or upper edge where the elongated section 70 meets the short, preferably curved section 80 of supplemental tag 10. Alternatively, FIG. 8 shows entrance slot 50 in the center of the curved section 80 of supplemental tag 10. One of ordinary skill in the art can manufacture supplemental tag 10 so that entrance slot 50 is in a position optimal for each application of permanent tag 20.

Figure 9:
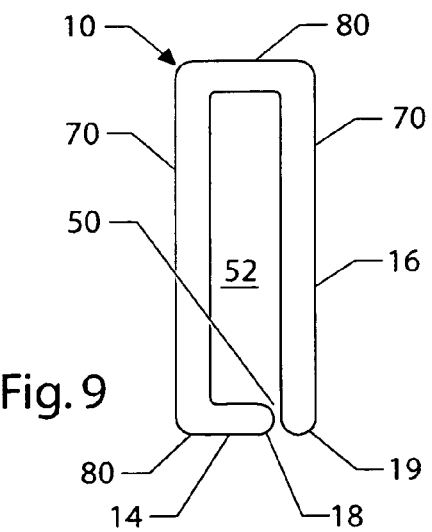
FIG. 9 is a top view of a sixth embodiment of a supplemental tag.

FIGS. 8 and 9 show alternative embodiments of a supplemental tag 10 having entrance slot 50 on the curved section 80. In FIG. 8, ends 18, 19 of arms 14, 16 form flattened abutting surfaces. When supplemental tag 10 is placed over permanent tag neck 26, the flattened surfaces are separated allowing ingress to attachment cavity 52. Separating flattened surfaces creates entrance slot 50. After permanent tag neck 26 has been inserted into attachment cavity 52, flattened surfaces again abut each other, helping to maintain permanent tag neck 26 within attachment cavity. In FIG. 9, end 18 of arm 14 comprises an elongated section serving as the bulk of the curved section 80. When permanent tag neck 26 is within attachment cavity 52, permanent tag neck 26 will abut the interior surface of end 18, thus being secured within attachment cavity 52.

FIG. 10 shows a supplemental tag 10 having a rotating gate 82 attached to end 18 of arm 14 via pin 84. Gate 82 can rotate from an open position to a closed position and back so as to allow easy access to attachment cavity 52. Gate 82 can be secured in the closed position via friction or other locking means.

FIG. 11 shows a supplemental tag 10 having a elongated rotating gate 82 corresponding to one of the elongated sections 70, also attached to end 18 of arm 14 via pin 84. Gate 82 can rotate from an open position to a closed position and back so as to allow easy access to attachment cavity 52. Gate 82 can be secured in the closed position via friction or other locking means. In this embodiment, arms 14,16 are of different lengths.

FIGS. 12A and 12B show a supplemental tag 10 of a folding design. As can be seen in FIG. 12B, supplemental tag 10 is a generally planar and rectangular piece 88 of flexible and durable material having closing prong 90 and shaft 96 proximal to a first end and closing hole 92 proximal to a second end distal from the first end. Supplemental tag 10 is placed about permanent tag 20, 100 and folded about centerline 94. Prong 90 is inserted through hole 92 to secure arm 14 to arm 16. Shaft 96 provides a spacing element to help create attachment cavity 52. The base of prong 90 preferably has a greater diameter or width than hole 92 so as to prevent prong 90 from exiting hole 92 and thus maintaining supplemental tag 10 in a closed configuration as shown in FIG. 12A. In this embodiment, the material of supplemental tag 10 should be flexible enough to be folded about centerline 94 and elastic enough for prong 90 and hole 92 to deform to allow prong 90 to pass through hole 92, and then to return to nearly the initial shape to hold prong 90 and not allow prong 90 to repass easily through hole 92.

FIG. 13 illustrates a common animal ankle tag 100 about the ankle of an animal. As shown in FIG. 14, supplemental tag 10 can be placed about or over ankle tag 100 in much the same manner and with much the same results as disclosed previously for ear tag 20. Any or all of the alternative embodiments disclosed previously also can be used in connection with ankle tag 100.

In operation and use, supplemental tag 10 is adapted for mounting about permanent tag 20, 100 for tagging animal 40 with information. As described herein, attachment cavity 52 of supplemental tag 10 is sized so that permanent tag neck 26 or permanent tag 100 can be fitted therein. As permanent tag 20, 100 can be already on animal 40, supplemental tag 10 can be used to place additional information on permanent tag 20, 100. Further, a user can add multiple supplemental tags 10 to continually add information to permanent tag 20, 100. Additionally, a user can remove supplemental tag 10 which can be indicative of various incorrect or outdated information. Thus, supplemental tag 10 provides a user a device that can flexibly add or remove information from animal 40.

One advantage of supplemental tag 10 is that it can be used to help maintain the accuracy of information on permanent tag 20, 100. As supplemental tag 10 can fit very easily on permanent tag 20, 100, a user can simply place the supplemental tag 10 onto permanent tag 20, 100. Further, for example, if animal 40 is given antibiotics after permanent tag 20, 100 has been placed on animal, the user can simply place the correct supplemental tag 10 on permanent tag 20, 100 to indicate that an antibiotic was indeed given. Alternatively, supplemental tag 10 can be used to correct a defect of permanent tag 20, 100.

Supplemental tag 10 can identify specific information regarding the animal 40 in a myriad of manners. For example, supplemental tag 10 can be a specific color or shape, wherein a specific color or shape can signify or indicate information about animal 40. Alternatively, as shown in FIG. 2, supplemental tag 10 can have language 12A affixed thereon conveying the information desired to be conveyed. Alternatively, as shown in FIG. 3, supplemental tag 10 can have a bar code or a computer "smart" chip 12B. It is understood that supplemental tag can convey information in other ways than described herein.

Further, it is understood that more than one supplemental tag 10 can be placed on permanent tag 20, 100. For example, the first supplemental tag can be placed on permanent tag 20, 100 after an event such a first vaccination and a second supplemental tag can be placed on permanent tag 20, 100 after a second vaccination. Supplemental tags 10 can be of different colors or contain different indicia. Thus, the present invention can allows for the continual update of information on permanent tag 20, 100.

The relatively simple structure of supplemental tag 10 can allow it to be manufactured relatively easily with inexpensive materials. Preferably, supplemental tag 10 can be molded from a single piece of resilient material such as plastic, other polymers, metals, or other resilient material that do not break easily. Such plastics, metals, and other materials are evident to and known by those of ordinary skill in the art.

The foregoing detailed description of the preferred embodiments and the appended figures have been presented only for illustrative and descriptive purposes and are not intended to be exhaustive or to limit the scope and spirit of the invention. The embodiments were selected and described to best explain the principles of the invention and its practical applications. One of ordinary skill in the art will recognize that many variations can be made to the invention disclosed in this specification without departing from the scope and spirit of the invention.

What is claimed is:

1. A combined animal information tag for providing primary and supplemental information about an animal, comprising:

a) a primary tag permanently attached to the animal and displaying primary information about the animal, wherein the primary tag comprises a tag body having a first planar dimension or a tag neck having a second planar dimension; and b) a supplemental tag attached to the primary information tag for displaying supplemental information about the animal, wherein the supplemental tag comprises two arms each having a first end and a second end, the first ends terminating at least proximal to each other and the second ends being connected to each other; a cavity between the two arms sized to conform to a selected portion of the primary tag; and an egress means between the first ends through which the primary tag can pass into the cavity, wherein the supplemental tag is a generally looped-shaped member having two generally parallel elongated sections and two generally short sections and is attached to the primary tag around the permanent tag body or permanent tag neck.

2. The combined animal information tag as claimed in claim 1, wherein the egress means is located on one of the elongated sections.

3. The combined animal information tag as claimed in claim 1, wherein the elongated sections transition into the short sections and the egress means is located proximal to a transition.

4. The combined animal information tag as claimed in claim 1, wherein the short sections are curved sections and the looped-shaped member is generally oval-shaped.

5. The combined animal information tag as claimed in claim 1, wherein the first ends abut one another.

6. The combined animal information tag as claimed in claim 1, wherein at least one of the first ends of the arms has a tooth structure.

7. The combined animal information tag as claimed in claim 1, wherein at least one of the arms is sufficiently flexible to allow one arm to flex away from the other arm so as to allow the supplemental tag to slide over the primary tag.

8. The combined animal information tag as claimed in claim 1, wherein the supplemental information regarding the animal is indicated by placing at least one color indicator on the supplemental tag.

9. The combined animal information tag as claimed in claim 8, wherein the entire supplemental tag is a single color to indicate the supplemental information regarding the animal.

10. The combined animal information tag as claimed in claim 1, wherein the primary tag is an ear tag comprising the tag body and the tag neck and the second planar dimension is smaller than the first planar dimension.

11. The combined animal information tag as claimed in claim 1, wherein the primary tag is an ankle tag comprising the tag body and the supplemental tag is attached to the primary tag around the tag body.

12. A combined animal information tag for providing primary and supplemental information about an animal, comprising:

a) a primary tag permanently attached to the animal and displaying primary information about the animal, wherein the primary tag comprises a tag body having a first planar dimension or a tag neck having a second planar dimension; and b) a supplemental tag attached to the primary information tag for displaying supplemental information about the animal, wherein the supplemental tag comprises two arms each having a first end and second end, the first ends terminating at least proximal to each other and the second ends being connected to each other; a cavity between the two arms sized to conform to a selected portion of the primary tag; and an egress means between the first ends through which the primary tag can pass into the cavity, wherein the supplemental tag is attached to the primary tag around the permanent tag body or permanent tag neck and wherein the supplemental information regarding the animal is contained in a computer chip attached to or a part of the supplemental tag.

13. The combined animal information tag for providing primary and supplemental information about an animal, comprising:

a) a primary tag permanently attached to the animal and displaying primary information about the animal; and b) a supplental tag attached to the primary information tag for displaying supplemental information about the animal, wherein the supplemental tag is a generally looped-shaped member having two generally parallel elongated sections and two generally short sections and comprises two arms each having a first end and a second end, the first ends terminating at least proximal to each other and the second ends being connected to each other; a cavity between the two arms sized to conform to a selected portion of the primary tag; and an egress means between the first ends through which the primary tag can pass into the cavity.

14. The combined animal information tag as claimed in claim 13, wherein the egress means is located on one of the elongated sections.

15. The combined animal information tag as claimed in claim 13, wherein the first ends abut one another.

16. The combined animal information tag as claimed in claim 13, wherein at least one of the first ends of the arms has a tooth structure.

17. The combined animal information tag as claimed in claim 13, wherein at least one of the arms is sufficiently flexible to allow one arm to flex away from the other arm so as to allow the supplemental tag to slide over the primary tag.

18. The combined animal information tag as claimed in claim 13, wherein the entire supplemental tag further comprises at least one color to indicate the supplemental information regarding the animal.

19. The combined animal information tag as claimed in claim 13, wherein the supplemental information regarding the animal is contained in a computer chip attached to or a part of the supplemental tag.

20. The combined animal information tag as claimed in claim 13, wherein the primary tag is selected from the group consisting of (a) an ear tag comprising a tag body having a first planar dimension and a tag neck having a second planar dimension smaller than the first planar dimension, and the supplemental tag is attached to the primary tag around the tag body or tag neck; and (b) an ankle tag comprising a tag body having a first planar dimension, and the supplemental tag is attached to the primary tag around the tag body.

* * * * *